(12) United States Patent
Yamamoto et al.

(10) Patent No.: US 6,878,065 B2
(45) Date of Patent: Apr. 12, 2005

(54) VIDEO GAME SYSTEM, CHARACTER ACTION CONTROL METHOD, AND READABLE STORAGE MEDIUM STORING CHARACTER ACTION CONTROL PROGRAM

(75) Inventors: Masahiro Yamamoto, Ibaraki (JP); Kentaro Hisai, Kobe (JP)

(73) Assignee: Konami Corporation, Tokyo (JP)

( * ) Notice: Subject to any disclaimer, the term of this patent is extended or adjusted under 35 U.S.C. 154(b) by 150 days.

(21) Appl. No.: 09/956,167

(22) Filed: Sep. 19, 2001

(65) Prior Publication Data

US 2002/0034979 A1 Mar. 21, 2002

(30) Foreign Application Priority Data

Sep. 21, 2000 (JP) ........................................ 2000-287462

(51) Int. Cl.$^7$ ................................................. A63F 9/22
(52) U.S. Cl. .............................. 463/31; 463/1; 345/473
(58) Field of Search ............................ 463/1–9, 30–33, 463/36–38, 43; 345/473, 474, 475, 706

(56) References Cited

U.S. PATENT DOCUMENTS

| | | | | |
|---|---|---|---|---|
| 5,498,002 A | * | 3/1996 | Gechter ........................ | 463/31 |
| 5,577,185 A | * | 11/1996 | Tunnell et al. ............... | 345/473 |
| 5,880,731 A | * | 3/1999 | Liles et al. .................. | 715/758 |
| 5,890,964 A | * | 4/1999 | Aoki et al. .................... | 463/44 |
| 6,031,549 A | * | 2/2000 | Hayes-Roth ................. | 345/473 |
| 6,088,042 A | * | 7/2000 | Handelman et al. ........ | 345/473 |
| 6,329,994 B1 | * | 12/2001 | Gever et al. ................. | 345/473 |
| 6,359,622 B1 | * | 3/2002 | Hayes-Roth ................. | 345/474 |
| 6,377,263 B1 | * | 4/2002 | Falacara et al. ............. | 345/473 |
| 6,388,665 B1 | * | 5/2002 | Linnett et al. ............... | 345/473 |
| 6,692,357 B1 | * | 2/2004 | Koizumi et al. ............. | 463/32 |

FOREIGN PATENT DOCUMENTS

| | | | |
|---|---|---|---|
| EP | 0 913 175 | 5/1999 | |
| JP | 09-222881 | * 8/1997 | ............ G09G/5/36 |
| JP | 10-165647 | 6/1998 | |
| JP | 2000-116944 | 4/2000 | |

OTHER PUBLICATIONS

Richard "KZ" Knight, 'Star Wars: X–Wing Alliance—Strategy Guide', (Apr. 24, 1999), <http://www.makeitsimple.com/gaming/–game_guides/xwing_alliance> downloaded from the Internet on Aug. 10, 2003, pp. 1–8.*

Richard "KZ" Knight, 'Star Wars: X–Wing Alliance—Review', (Apr. 20, 1999), <http://www.makeitsimple.com/gaming/–game_reviews/xwingalliance/> downloaded from the Internet on Aug. 10, 2003, pp. 1–13.*

Desslock, 'X–Wing Alliance Review', (Apr. 6, 1999), <http://www.gamespot.com/pc/sim/starwarsxwingalliance/review.html> downloaded from the Internet on Aut. 10, 2003, pp. 1–4.*

(Continued)

*Primary Examiner*—Mark Sager
*Assistant Examiner*—Steven Ashburn
(74) *Attorney, Agent, or Firm*—Jordan and Hamburg LLP

(57) ABSTRACT

A main character G is displayed in the center of a screen, an option character C is displayed at the lower right side of the main character G, and an enemy character N is displayed at an upper right part of the screen. FIG. 7A shows a state where the enemy character N is locked by operation of a game player and a lock mark L is displayed, and FIG. 7B shows a state where the option character C is attacking the enemy character N in response to another operation of the game player. A game can be made more interesting and ingenious by letting the game player involve in the actions of the option character which is a follower character of the main character.

20 Claims, 9 Drawing Sheets

OTHER PUBLICATIONS

Azure Dreams Instruction Manual, Konami (1998) pp. 1–29.*

Billy Sauls, Azure Dreams FAQ v3.0 (Jun. 23, 1999), pp. 1–61, downloaded from the Internet webpage http://db.gamefaqs.com/console/psx/file/azure_dreams_f.txt on Apr. 12, 2004.*

Pages 16 to 21 of a manual book attached to the video game "Schenmue, first chapter, Yokosuka" sold by Kabushiki Kaisha Sega on Dec. 29, 1999.

Pages 14, 15, and 134 of "Langresser V, a method for the sure victory" published by Kabushiki Kaisha Futaba–sha on Jul. 20, 1998.

* cited by examiner

VIDEO GAME SYSTEM, CHARACTER ACTION CONTROL METHOD, AND READABLE STORAGE MEDIUM STORING CHARACTER ACTION CONTROL PROGRAM

The present invention relates to a video game system capable of letting a main character go through a simulated experience (roll-playing) instead of a game player, a character action control method and a readable storage medium storing a character action control program.

BACKGROUND OF THE INVENTION AND RELATED ART STATEMENT

As roll-playing games in which a game player goes through a simulated experience as a video character (hereinafter, merely "character") on a video screen, adventure games in which a main character grows while repeating various actions such as battles with, procurements of and operations of objects such as other characters, items and device objects in various scenes are known. In the case of games of this type, gaming nature is improved by providing the respective objects with different abilities, personalities, characteristics, etc.

In the above adventure games, various abilities of the main character change as the main character take various actions such as battles with, procurements of and operations of objects. However, since ability changing factors depend only on contents of actions taken against the objects, these games tend to lack ingenuity as a game.

Accordingly, games whose ingenuity is improved by adopting characters called option characters which are followers of the main character have been developed in recent years. However, since the conventional option characters act in accordance with a game program regardless of operation by the game player, the game player has a little personal attachment to the option characters although they are followers of the main character. Thus, adoption of the option characters has led to only a little improvement of ingenuity.

In view of the above situation, an object of the present invention is to provide a video game system capable of providing a highly ingenious and interesting game by letting a game player involve in actions of option characters, a character action control method and a readable storage medium storing a character action control program.

In order to achieve the above object, the present invention relates to a character action control method used in a video game in which game images including a main character and an option character which is a follower character of the main character are displayed in a game space. The method comprises the steps of storing contents of actions taken by the option character against objects appearing in the game for each of the objects excluding the option character, selecting any one of the objects excluding the option character in the game space as a target in response to operation of a first operable member, displaying a visually recognizable mark for the selected object, and causing the option character to execute the content of the action against the target in response to operation of a second operable member.

According to this method, the game player operates the first operable member to select the target. Further, when the game player operates the second operable member, an instruction is given to cause the option character to execute the content of action against the target. Since the game player can get involve in the option character's actions by the above two operations, he has more personal attachment to the option character, which leads to an improved ingenuity of the game.

These and other objects, features and advantages of the present invention will become more apparent upon a reading of the following detailed description and accompanying drawings.

BRIEF DESCRIPTION OF THE DRAWINGS

FIGS. 7A and 7B are diagrams showing a screen when a target is an enemy target, wherein FIG. 7A shows a scene where the target is locked and FIG. 7B shows a scene where an option character acts against the locked target, FIGS. 8A and 8B are diagrams showing the screen when a target is an air blower, wherein FIG. 8A shows a scene where the target is locked and FIG. 8B shows a scene where the option character acts against the locked target, FIGS. 9A and 9B are diagrams showing the screen when a target is an item, wherein FIG. 9A shows a scene where the target is locked and FIG. 9B shows a scene where the option character acts against the locked target, and FIGS. 10A and 10B are diagrams showing the screen when a target is a citizen character, wherein FIG. 10A shows a scene where the target is locked and FIG. 10B shows a scene where the option character acts against the locked target.

DETAILED DESCRIPTION OF THE PREFERRED EMBODIMENTS OF THE PRESENT INVENTION

Figure 1:
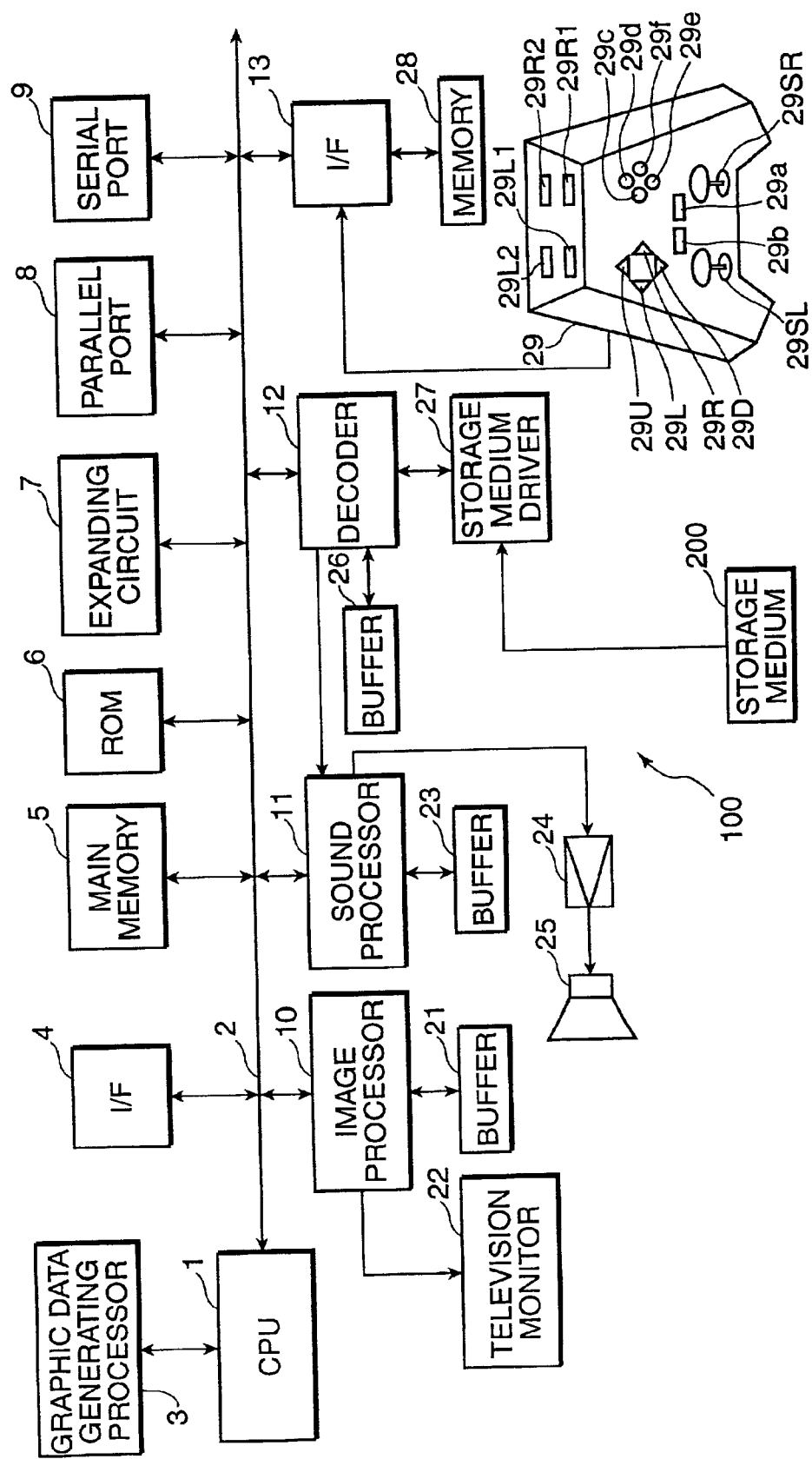
FIG. 1 is a block construction diagram showing one embodiment of a video game system according to the invention.

FIG. 1 is a block construction diagram showing one embodiment of a video game system according to the invention. This game system is comprised of a main game unit 100, and a storage medium 200 storing a program data. The main game unit 100 is provided with a CPU 1, a bus line 2 including address busses, data busses and control busses and connected with the CPU 1, a graphic data generating processor 3 and the respective elements connected with the bus line 2.

With the bus line 2 are connected an interface circuit 4, a main memory 5 including a RAM or the like, a ROM 6, an expanding circuit 7, a parallel port 8, a serial portion 9, an image processor 10, a sound processor 11, a decoder 12, and an interface circuit 13.

With the image processor 10 are connected a buffer 21 and a television monitor (hereinafter, merely "monitor") 22. With the sound processor 11 are connected a buffer 23 and a loudspeaker 25 via an amplifying circuit 24. With the decoder 12 are connected a buffer 26 and a storage medium driver 27. With the interface circuit 13 are connected a memory 28 and a controller 29.

The mode of this game system differs depending on its application. For example, the monitor 22 and the loudspeaker 25 are separate from the main game unit 100 in the case that this game system is constructed for home use, whereas all the elements shown in FIG. 1 are contained as a unit in one casing in the case that this game system is constructed for business use.

In the case that this game system is constructed with a personal computer or a workstation as a core, the monitor 22 corresponds to a computer display, the image processor 10, the sound processor 11 and the expanding circuit 7 correspond to part of the game program data stored in the storage medium 200 or hardware on an extension board mounted on an extension slot of the computer, and the interface circuit 4, the parallel port 8, the serial port 9 and the interface circuit 13 correspond to hardware on the extension board mounted on the extension slot of the computer. Further, the buffers 21, 23, 26 correspond to the main memory 5 or the respective areas of an extension memory (not shown).

A case where this game system is constructed for home use is described below.

Next, the respective elements shown in FIG. 1 are described. The graphic data generating processor 3 acts as a coprocessor of the CPU 1. Specifically, this graphic data generating processor 3 performs coordinate transform and light source calculation: e.g. performs fixed point arithmetic of matrices and vectors by parallel processing. Main operations of the graphic data generating processor 3 include an operation of obtaining an address of an image to be processed in a display area based on coordinate data of the respective vertices of an image data supplied from the CPU 1 in a two-dimensional (2D) or three-dimensional (3D) space, a movement amount data, and a rotation amount data and returning the address data back to the CPU1, and an operation of calculating a luminance of the image according to a distance from a virtually set light source.

The interface circuit 4 serves as an interface for peripheral devices including a pointing device such as a mouse or a track ball. The program data as an operating system of the game system is stored in the ROM 6, which corresponds to a basic input/output system (BIOS) in a personal computer.

The expanding circuit 7 expands an image compressed by intra-coding in accordance with the moving picture engineering group (MPEG) for animated images and the joint picture engineering group (JPEG) for still images. Expansion includes decoding (decoding of a data encoded by a variable length code), reverse quantization, inverse discrete cosine transform (IDCT), restoration of intra-images.

The image processor 10 forms an image to be written in the buffer 21 at intervals of a specified time T (one frame, e.g. T==1/60 sec.) in accordance with an imaging command issued by the CPU 1. The buffer 21 is, for example, a RAM and includes a display area (frame buffer) and a non-display area. The display area is comprised of a development area of a data to be displayed on a display surface of the monitor 22.

In this embodiment, the non-display area is comprised of a storage area for data defining skeletons, model data defining polygons, animation data causing models to animate, pattern data representing contents of the respective animated movements, texture data, color palette data, etc.

Here, the texture data are 2D image data, and the color palette data are data for designating colors of the texture data and the like. These data are read at once or separately a plurality of times according to the progress of the game and stored in the non-display area of the buffer 21 in advance by the CPU 1.

Imaging commands include an imaging command for generating solid 3D images using polygons and an imaging command for generating usual 2D images. Here, the polygons are polygonal 2D virtual figures: triangle figures are used in this embodiment.

The imaging command for generating a solid 3D image using the polygons is comprised of polygon vertex address data in the display area of the buffer 21, texture address data representing stored positions of the texture data to be adhered to the polygons in the buffer 21, color palette address data representing stored positions of the color palette data indicating the color of the texture data in the buffer 21, and luminance data representing the luminance of the textures.

Among the above data, the polygon vertex address data in the display area are polygon vertex coordinate data in the 2D space obtained by applying a coordinate transform to polygon vertex coordinate data in the 3D space from the CPU 1 based on a movement amount data and a rotation amount data of a screen itself by means of the graphic data generating processor 3. Further, the luminance data are determined based on distances between the positions represented by the polygon vertex coordinate data after the coordinate transform and the virtually arranged light source by means of the graphic data generating processor 3.

The polygon vertex address data represent addresses in the display area of the buffer 21, and the image processor 10 writes a texture data corresponding to a range of the display area of the buffer 21 defined by three polygon vertex address data.

One object is formed by a multitude of polygons. The CPU 1 stores the coordinate data of the respective polygons in the 3D space in the buffer 21 in relation to vector data of the corresponding skeletons. The following processing is performed in the case that a character is moved on the display surface by operating the controller 29, i.e. a movement of the character itself is expressed or a point of viewing the character is changed.

Specifically, the CPU 1 feeds the 3D coordinate data of the vertices of the respective polygons held in the non-display area of the buffer 21 and the movement amount data and the rotation amount data of the respective polygons, which were obtained from the coordinates and the rotation amount data of the skeletons, to the graphic data generating processor 3.

The graphic data generating processor 3 successively calculates the 3D coordinate data of the respective polygons after the movement and rotation based on the 3D coordinate data of the vertices of the respective polygons and the movement amount data and the rotation amount data of the respective polygons.

Among the thus obtained 3D coordinate data of the respective polygons, those in horizontal and vertical directions are fed to the image processor 10 as the address data in the display area of the buffer 21, i.e. as the polygon vertex address data.

The image processor 10 writes a texture data represented by the texture address data allotted in advance in the triangular display area of the buffer 21 defined by three polygon vertex address data. In this way, an object formed by adhering the texture data to a multitude of polygons is displayed on the display surface of the monitor 22.

The imaging command for generating a usual 2D image is comprised of vertex address data, texture address data, color palette address data representing stored positions of the color palette data indicating the color of the texture data in the buffer 21, and luminance data representing the luminance of the textures. Among these data, the vertex address data are coordinate data obtained by applying a coordinate transform to vertex coordinate data in the 2D space from the CPU 1 based on a movement amount data and a rotation amount data from the CPU 1 by means of the graphic data generating processor 3.

The sound processor 11 writes an ADPCM data read from the storage medium 200 in the buffer 23 to use the ADPCM data stored in the buffer 23 as a sound source. The sound processor 11 reads the ADPCM data based on a clock signal having a frequency of, e.g. 44.1 kHz.

The sound processor 11 applies various processings such as pitch conversion, addition of noise, envelope setting, level setting, addition of reverb to the ADPCM data read from the buffer 23.

If the sound data read from the storage medium 200 is a PCM data such as a compact disk digital audio (CD-DA) data, the read sound data is converted into the ADPCM data by the sound processor 11.

Further, processing of the PCM data by the program data is directly performed in the main memory 5. The PCM data processed in the main memory 5 is fed to the sound processor 11 and converted into an ADPCM data and then is outputted as a sound from the loudspeaker 25 after the aforementioned various processings are applied thereto.

The storage medium driver 27 is, for example, a CD-ROM drive, a hard disk driver, an optical disk drive, a flexible disk drive, a silicone disk drive, or a cassette medium reader.

The storage medium 200 is, for example, a CD-ROM, a hard disk, an optical disk, a flexible disk or a semiconductor memory.

The storage medium driver 27 reads the images, sounds and program data from the storage medium 200 and feeds the read data to the decoder 12. The decoder 12 applies error correction using an error correction code (ECC) to the reproduced data from the storage medium driver 27, and feeds the resulting data to the main memory 5 or the sound processor 11.

The memory 28 is, for example, a holder or a card type memory. The card type memory is adapted to hold various game parameters so as to hold a state, for example, when the game is interrupted midways.

The controller 29 is an externally operable operation means, is provided with a first left button 29L1, a second left button 29L2, a first right button 29R1, a second right button 29R2, an up-key 29U, a down-key 29D, a left-key 29L, a right-key 29R, a start button 29a, a select button 29b, a first button 29c, a second button 29d, a third button 29e, a fourth button 29f, a left stick 29SL and a right stick 29SR, and is adapted to send an operation signal corresponding to the operation of a game player to the CPU 1.

The up-key 29U, the down-key 29D, the left-key 29L and the right-key 29R are used by the game player to give commands to the CPU 1 to move, for example, a character or a cursor on the screen of the monitor 2.

The start button 29a is operated by the game player to instruct the start of the game program data loaded from the storage medium 200 to the CPU 1. The select button 29b is operated by the game player to instruct the CPU 1 various selections concerning the game program data to be loaded in the main memory 5 from the storage medium 200.

The respective buttons and keys of the controller 29 except the left stick 29SL and the right stick 29SR are on-off switches which are turned on from their neutral positions by a pressing force from the outside and returned to the neutral positions upon being freed from the pressing force.

The left and right sticks 29SL, 29SR are stick-shaped controllers having substantially the same construction as a so-called joystick. Specifically, the controller 29 has standing sticks, which can be inclined to front, back, left, right or in any direction in a 360 range about specified points of the sticks as supporting points. According to the direction and angle of inclination of the stick, an X-coordinate along transverse direction and a Y-coordinate along forward/backward direction in coordinate systems having the standing position of the stick as an origin are sent as an operation signal to the CPU 1 via the interface circuit 13.

The functions of the first left button 29L1, the second left button 29L2, the first right button 29R1 and the second right button 29R2 differ depending on the game program data to be loaded from the storage medium 200.

Next, the operation of this game system is summarily described. A power switch (not shown) is turned on to apply a power to the game system. At this time, if the storage medium 200 is mounted in the storage medium driver 27, the CPU 1 instructs the storage medium driver 27 to read the program data from the storage medium 200 in accordance with the operating system stored in the ROM 6. In response to this instruction, the storage medium driver 27 reads the images, sounds and program data from the storage medium 200. The read images, sounds and program data are fed to the decoder 12, where error correction is applied thereto.

The image data to which error correction was applied in the decoder 12 are fed via the bus line 2 to the expanding circuit 7, where the aforementioned expansion is applied thereto. The resulting image data are fed to the image processor 10, which in turn writes them in the non-display area of the buffer 21.

The sound data to which error correction was applied in the decoder 12 are either written in the main memory 5 or fed to the sound processor 11 to be written in the buffer 23.

The program data to which error correction was applied in the decoder 12 are written in the main memory 5. Hereafter, the CPU 1 executes the game in accordance with the game program data stored in the main memory 5 and contents of instructions given by the game player via the controller 29. In other words, the controller 29 suitably controls image processing, sound processing and internal processing based on the contents of instructions given by the game player via the controller 29.

In this embodiment, the control for the image processing includes, for example, calculation of the coordinates of the respective skeletons and calculation of the vertex coordinate data of the respective polygons based on a pattern data corresponding to an animation instructed for the character, feed of the obtained 3D coordinate data and a viewpoint data to the graphic data generating processor 3, issuance of the imaging commands including the address data in the display area of the buffer 21 and the luminance data calculated by the graphic data generating processor 3. The control for the sound processing includes, for example, issuance of sound output commands to the sound processor 11 and designation of levels, reverbs, etc. The control for the internal processing includes, for example, calculation according to the operation of the controller 29.

Figure 2:
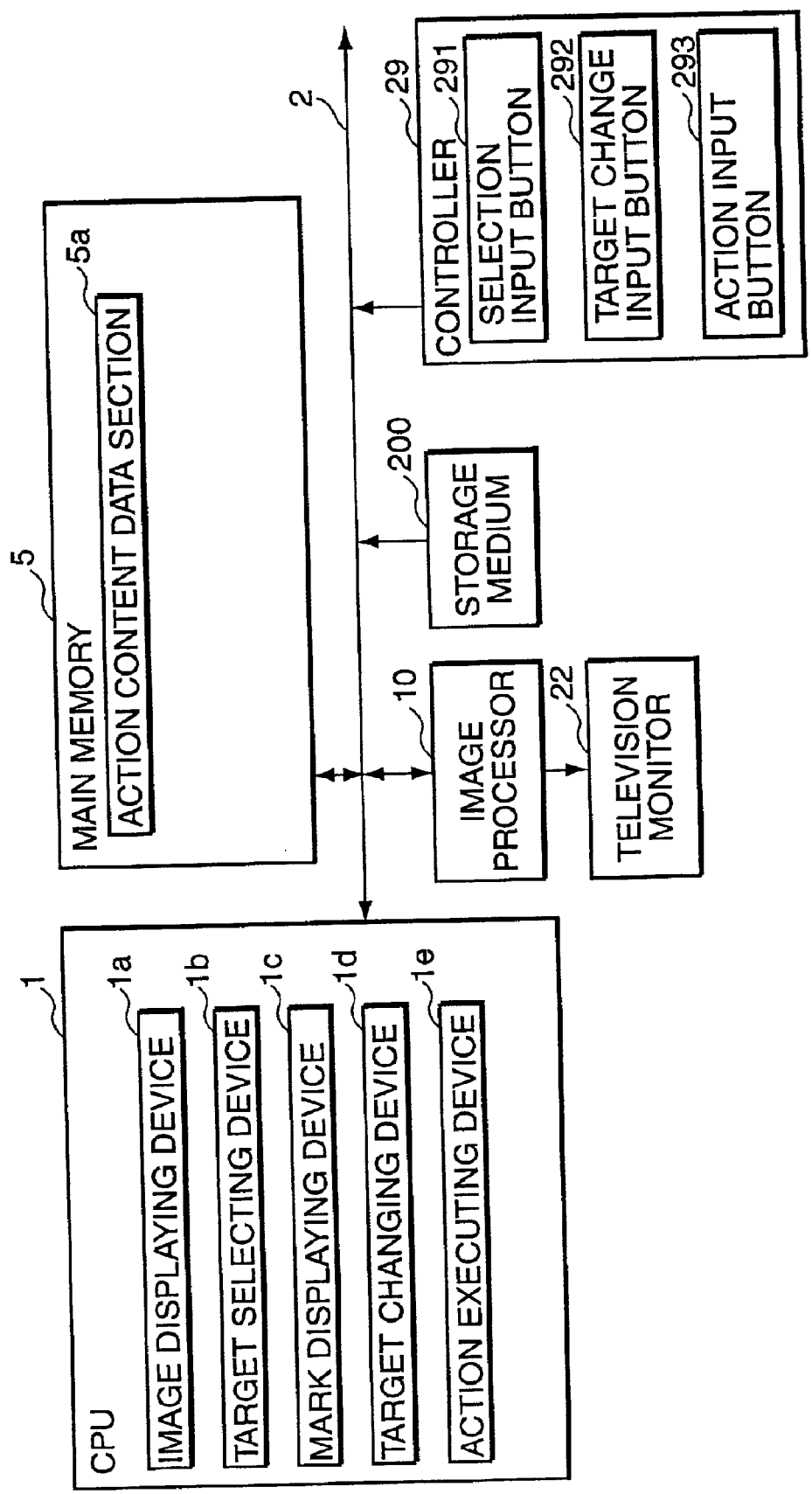
FIG. 2 is a block diagram showing an essential portion of a control unit.

FIG. 2 is a block diagram showing an essential portion of the control unit. The controller 29 is provided with a selection input button 291 operated when the game player selects a target from objects, a target change input button 292 operated when the game player changes the target, and an action input button 293 operated when the option character which is a follower character of the main character is caused to take a specific action against the target. The contents of the specific actions are stored in an action content data section 5a of the main memory 5 in advance. It is assumed that the selection input button 291, the target change input button 292 and the action input button 293 are suitably allotted to some of the respective operation buttons of the controller 29 described with reference to FIG. 1. For instance, the selection input button 291 is allotted to the second left button 29L2; the target change input button 292 to the right stick 29SR; and the action input button 293 to the fourth button 29f. The main memory 5 includes the action content data section 5a for storing data on contents of actions taken by the option character against the targets.

The CPU 1 is provided with an image display device 1a for displaying game images including the main character which acts in accordance with instructions given by the controller 29, a target selecting device 1b for detecting candidates for a target to be locked from the game image displayed when the selection input button 291 is operated and selecting one target from the detected candidates, a mark display device 1c for locking the selected target and displaying a lock mark at a position of the selected target in the game image, a target changing device 1d for changing the target from the locked target to a next one when the target change input button 292 is operated and an action executing device 1e for determining an action to be taken by the option character against the target and executing the determined action when the action input button 293 is operated.

The target selecting device 1b detects some of the candidates for the target which are included in the game image displayed by the image display device 1a and are away from the main character by a specified distance or shorter in the game space. Here, the candidates for the target are objects such as characters, items and device objects. It should be noted that, if there is no candidate for the target, neither the target selecting device 1b nor the mark displaying device 1c operates. The target selecting device 1b determines one of the selected candidates which is closest to the main character in the game space as a target.

The mark displaying device 1c locks the target selected by the target selecting device 1b, and displays a lock mark having a size corresponding to a distance between a viewpoint of a virtual camera and the position of the selected target (precisely reference point of the target) at the position of the selected target. In other words, the longer the distance between the viewpoint of the virtual camera and the position of the target, the smaller lock mark is displayed. It should be noted that, even if the target moves, the lock mark is kept displayed.

The target changing device 1d changes locking of the target from the one locked by the target selecting device 1b to a next target. Accordingly, the lock mark displayed by the mark displaying device 1c is moved to the next target. Here, the candidates are selected as a target in an increasing order of their distances to the main character. In other words, when the target change input button 292 is operated N-th time, the candidate which is (N+1)th closest to the main character is selected as a target. If there is no more target to be selected, the last-selected target is kept locked.

The action executing device 1e first determines an action to be taken by the option character against the locked target. Here, which action is to be selected uniquely depends on the locked target. Specifically, actions to be taken by the option character are stored in the action content data section 5a for each of the lockable targets, and the action corresponding to the target is read from the action content data section 5a when the target is locked by the mark displaying device 1c or the target changing device 1d. The action executing device 1e also causes the option character to take the determined action against the target locked by the mark displaying device 1c or the target changing device 1d. Accordingly, the corresponding action is displayed on the screen. In the case that the locked target is an item, the item is unlocked upon execution of the action.

Figure 3:
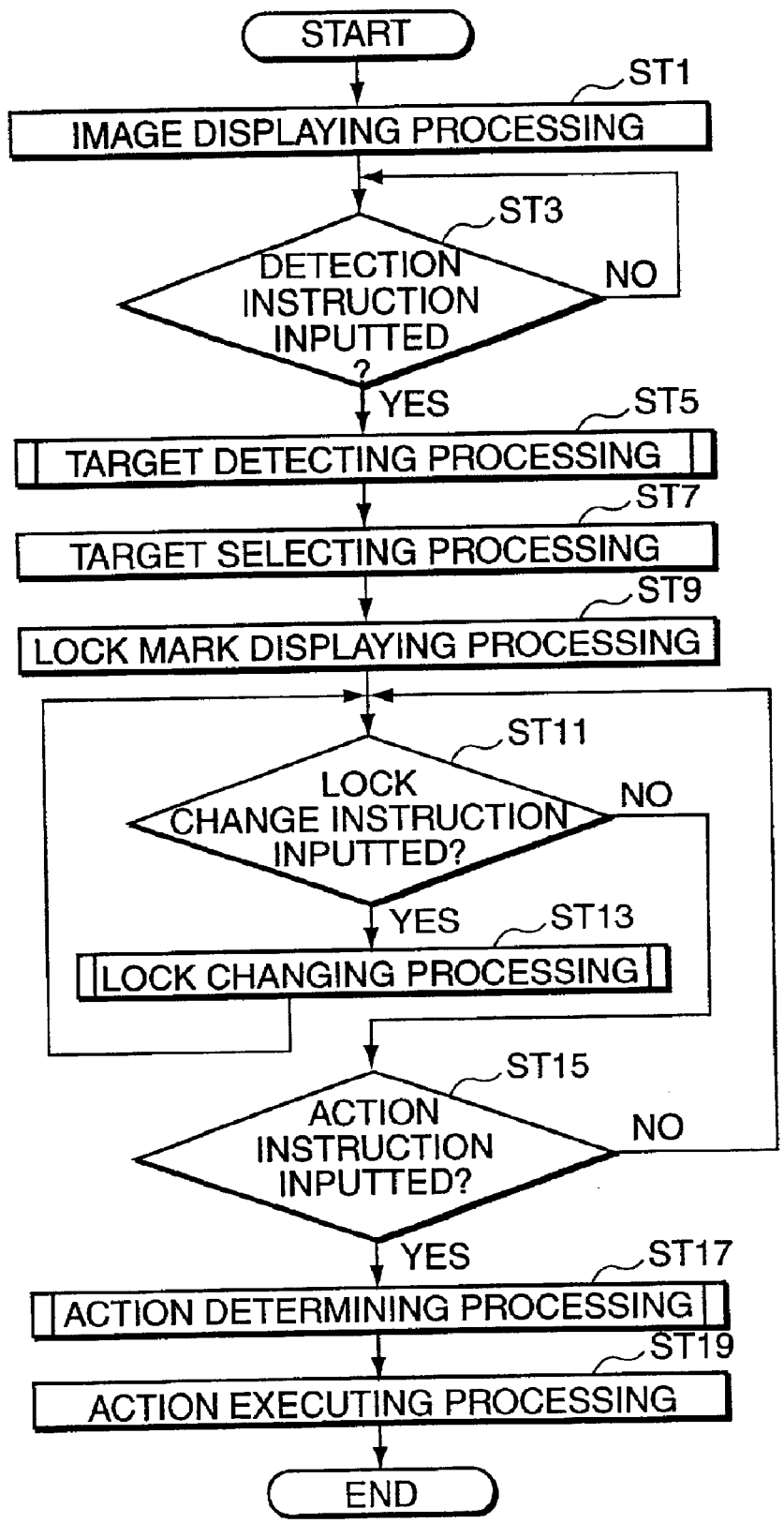
FIG. 3 is a flow chart showing a procedure of processing carried out by the control unit.

FIG. 3 is a flow chart showing a procedure of processing carried out by the control unit. First, the game screen is displayed by the image display device 1a (Step ST1). It is then discriminated whether the selection input button 291 has been operated (Step ST3). This routine waits on standby unless the selection input button 291 has been operated. If the selection input button 291 has been operated, the target selecting device 1b performs a target detecting processing for detecting candidates for the target to be locked from the displayed game image (Step ST5).

Subsequently, the target selecting device 1b performs a target selecting processing for selecting one target from the detected candidates (Step ST7). Then, the mark displaying device 1c locks the selected target and displays the lock mark at the position of this target in the game image (Step ST9). It is then discriminated whether the target change input button 292 has been operated (Step ST11). This routine proceeds to Step ST15 unless the target change input button 292 has been operated, whereas the target changing device 1d performs a target changing processing for changing locking of the target from the already locked target to a next target (Step ST13) if the target change input button 292 has been operated.

It is then discriminated whether the action input button 293 has been operated (Step ST15). This routine returns to Step ST11 unless the action input button 293 has been operated, whereas the action executing device 1e determines an action to be taken by the option character against the target (Step ST17) if the action input button 293 has been operated. Then, the action executing device 1e executes the determined action (Step ST19).

Figure 4:
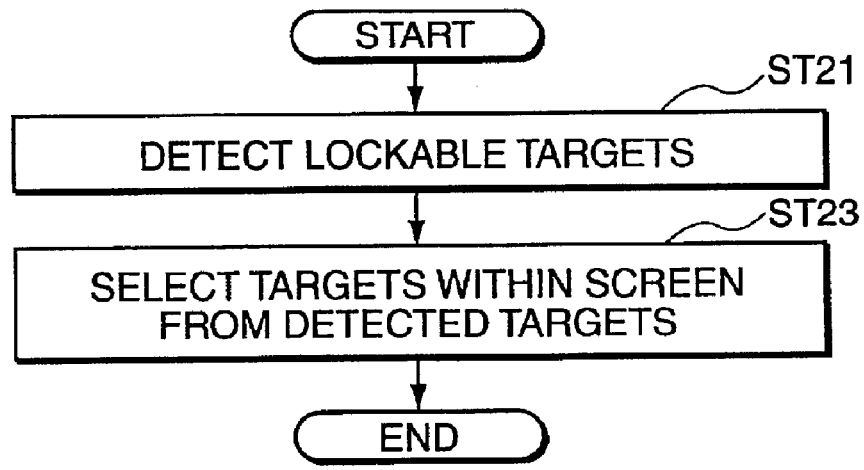
FIG. 4 is a flow chart showing a procedure of a target detecting processing.

FIG. 4 is a flow chart showing a procedure of the target detecting processing performed by the target selecting device 1b. First, those of the lockable targets whose distances from the main character are a specified value or shorter in the game space are detected (Step ST21). Subsequently, out of the detected targets, those whose reference points lie within the game image presently being displayed are selected as candidates to be locked (Step ST23).

Figure 5:
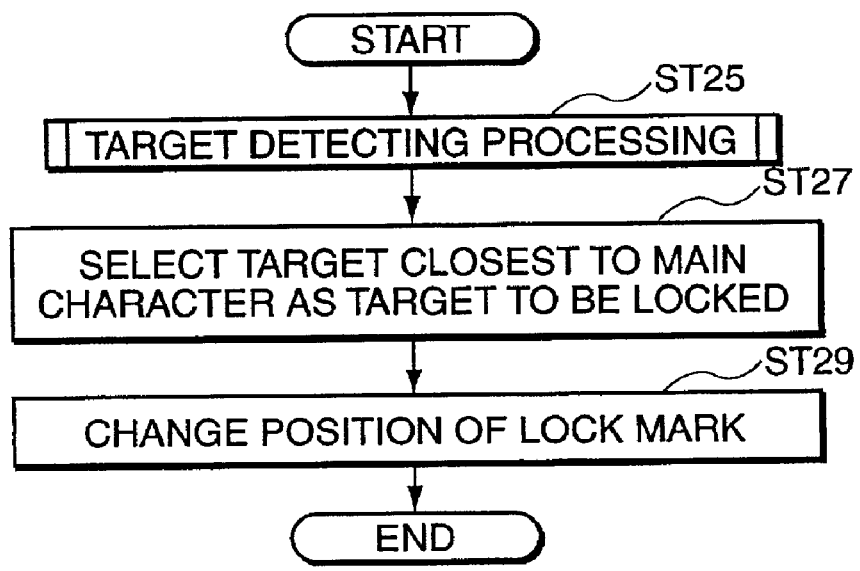
FIG. 5 is a flow chart showing a procedure of a target changing processing.

FIG. 5 is a flow chart showing a procedure of the target changing processing performed by the target changing device 1d. First, the target detecting processing shown in FIG. 4 is performed (Step ST25). Subsequently, the target whose distance to the main character is shortest next to the presently locked target in the game space is selected as a target to be locked (Step ST27). Then, the target having been locked is unlocked (the displayed lock mark is erased), the target selected in Step ST27 is locked, and the lock mark is displayed at the position of this target (Step ST29).

Figure 6:
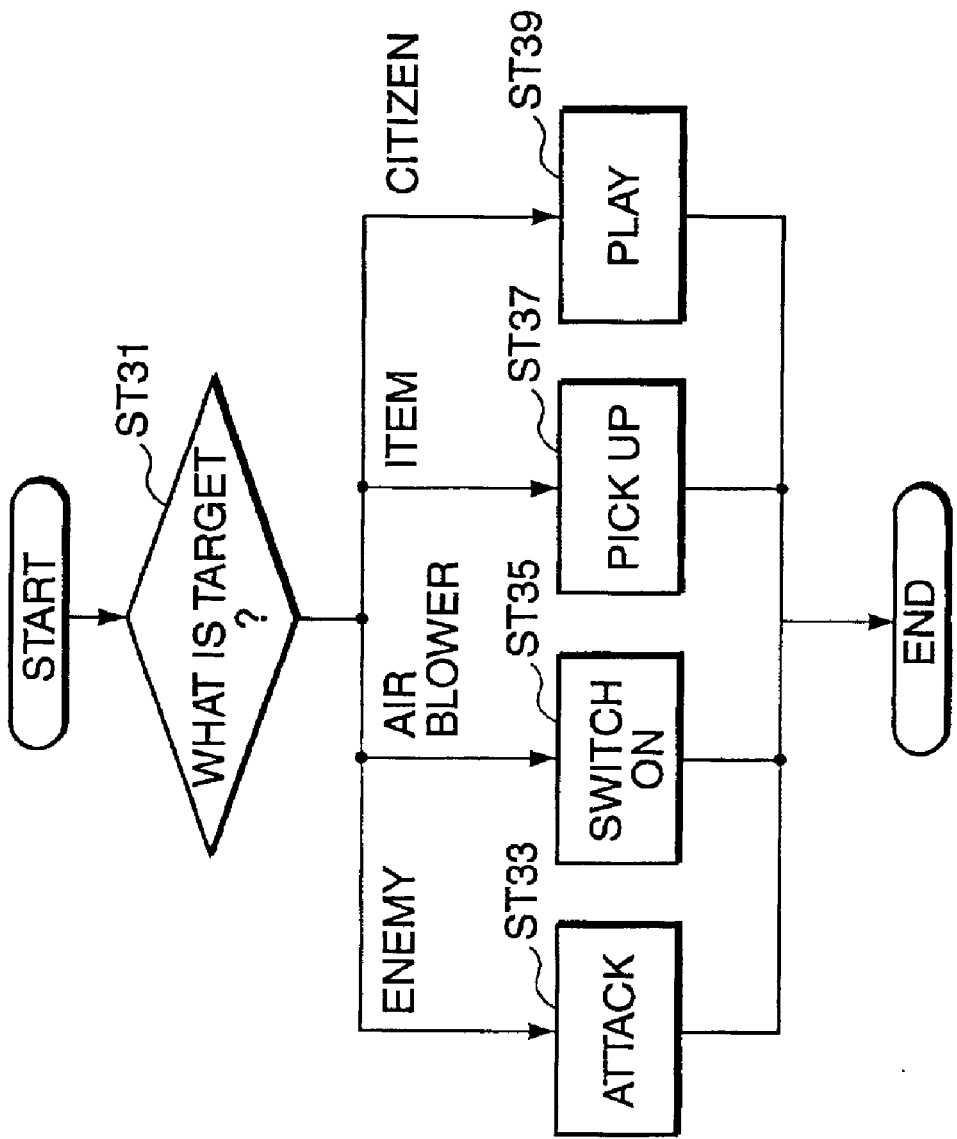
FIG. 6 is an exemplary flow chart showing a procedure of an action determining processing.

FIG. 6 is a flow chart showing an exemplary procedure of the action determining processing performed by the action executing device 1e. Here, description is given on a case where there are four kinds of targets to be locked: enemy character, air blower object, item and citizen character. First, it is judged what the locked target is (Step ST31). If the locked target is an enemy character, an action "Attack" is selected (Step ST33). If the locked target is an air blower object, an action "Switch On" is selected (Step ST35). If the locked target is an item, an action "Pick Up" is selected (Step ST37). If the locked target is a citizen character, an action "Play" is selected (Step ST39).

Figure 7A:
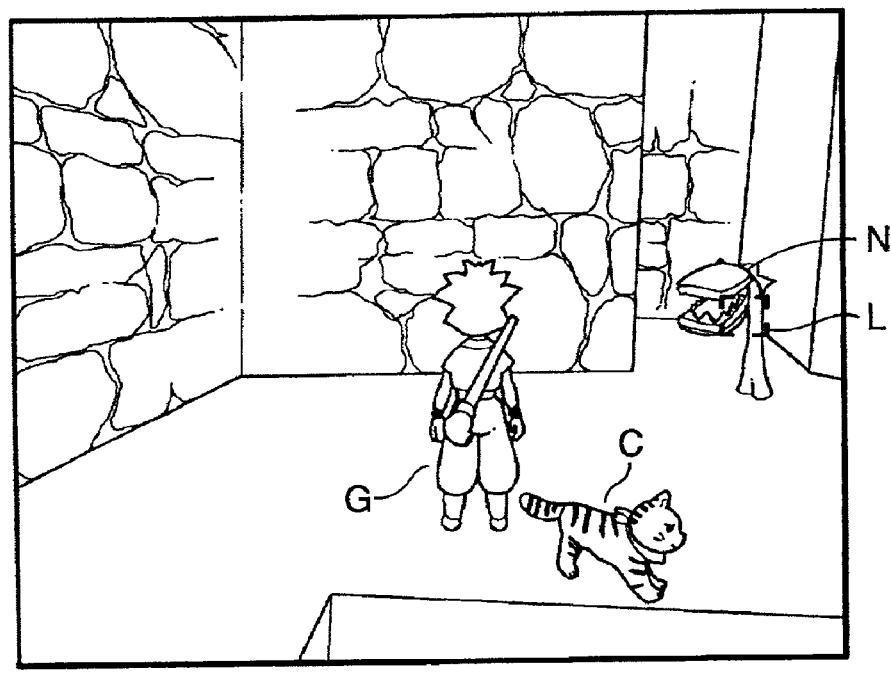
Figure 7B:
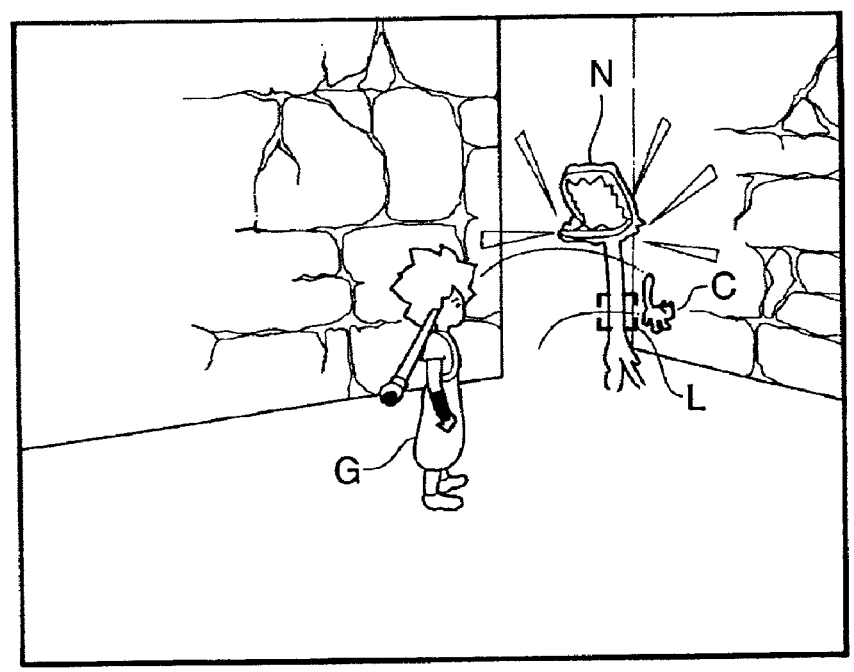
Figure 8A:
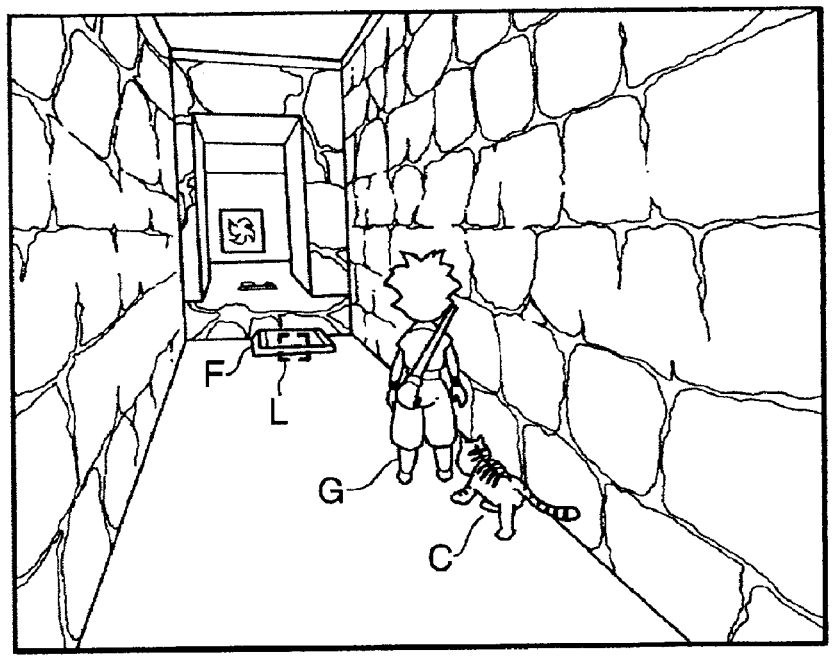
Figure 8B:
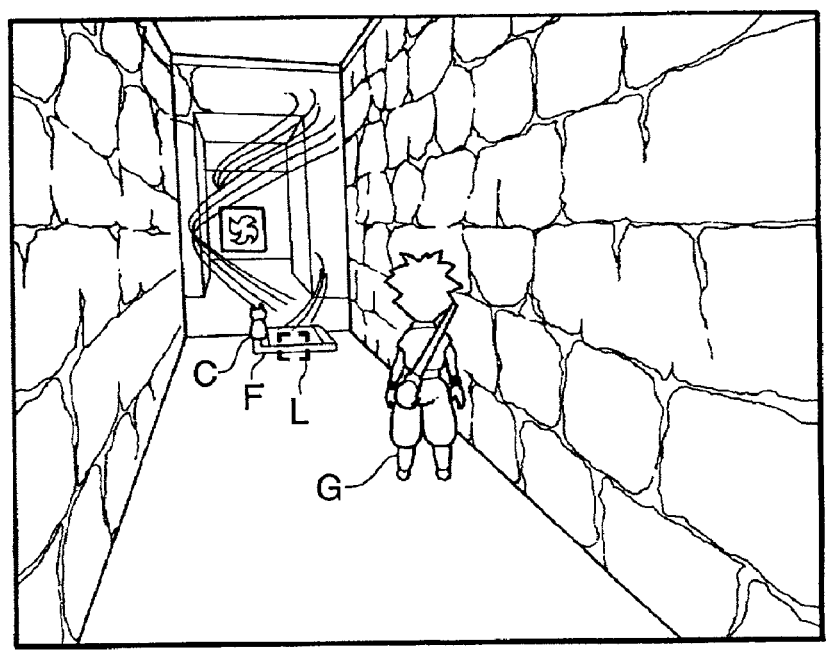
Figure 9A:
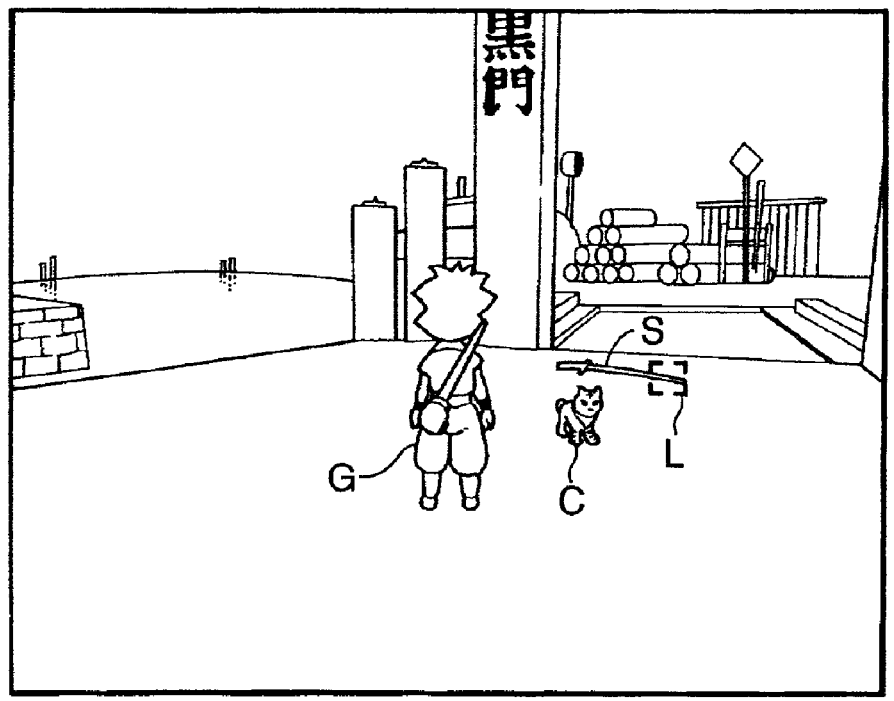
Figure 9B:
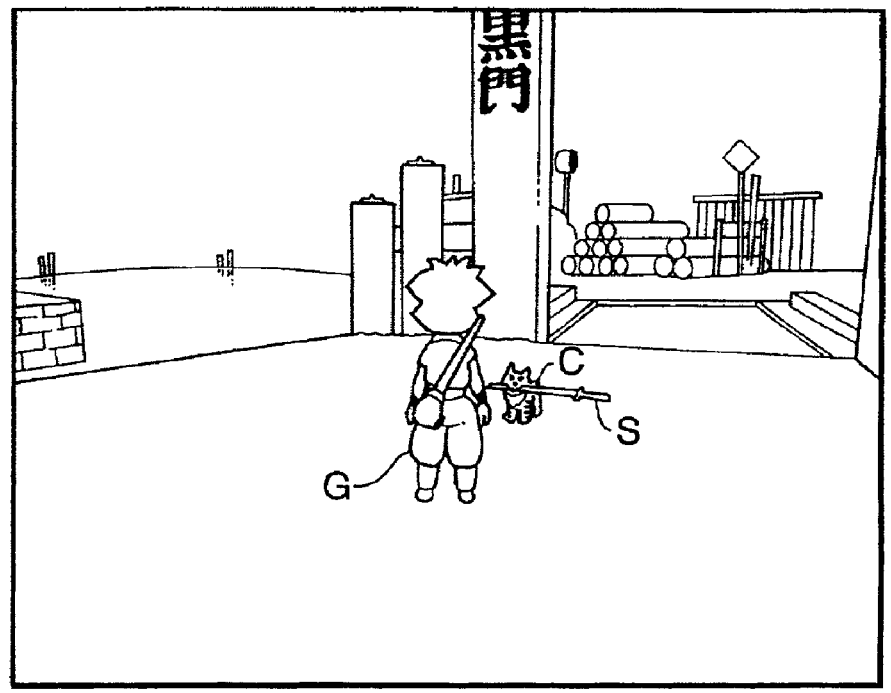
Figure 10A:
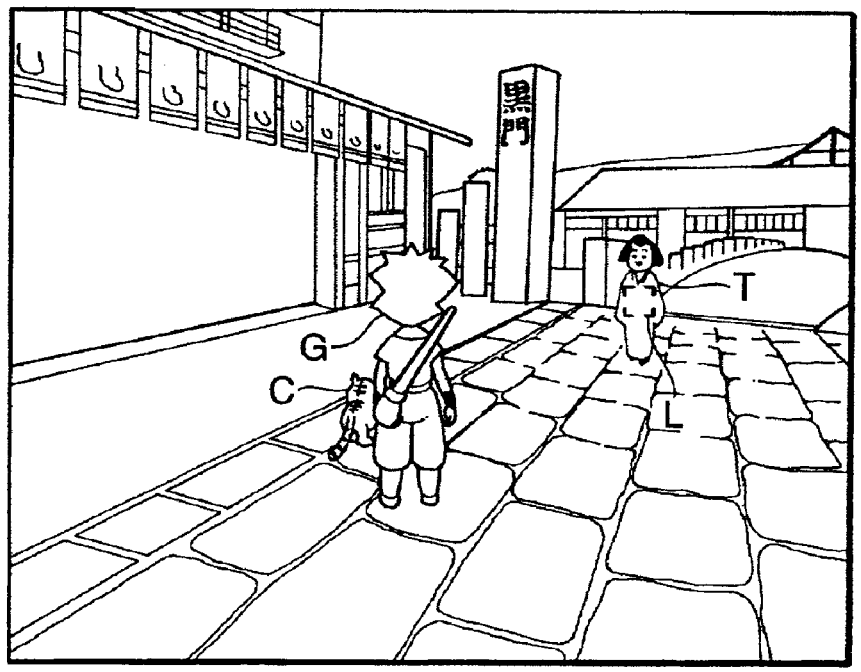
Figure 10B:
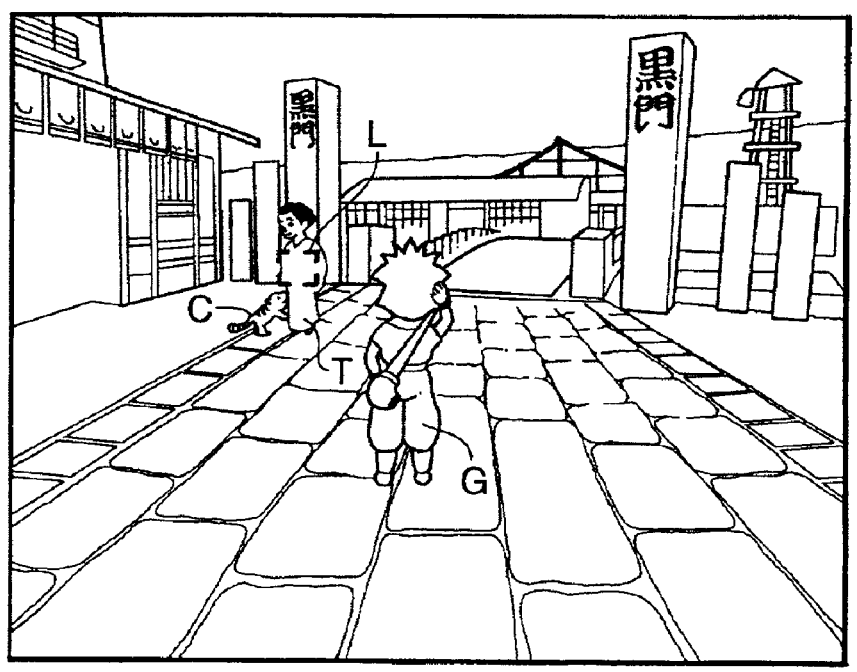

FIGS. 7A, 8A, 9A and 10A are diagrams showing scenes when the target is locked, and FIGS. 7B, 8B, 9B and 10B are diagrams showing scenes where the option character acts against the locked target. FIGS. 7A and 7B show a case where the target is an enemy character; FIGS. 8A and 8B show a case where the target is an air blower object; FIGS. 9A and 9B show a case where the target is an item; and FIGS. 10A and 10B show a case where the target is a citizen character.

In FIG. 7A, a main character G is displayed in the center of the screen, an option character C is displayed at the lower right side of the main character G, and an enemy character N is displayed at an upper right part of the screen. FIG. 7A shows a state where the enemy character N is locked and a lock mark L is displayed, and FIG. 7B shows a state where the option character C is attacking the enemy character N.

In FIG. 8A, the main character G is displayed in the center of the screen, the option character C is displayed at the lower right side of the main character G, and an air blower object F is displayed at an upper left part of the screen. FIG. 8A shows a state where the air blower object F is locked and the lock mark L is displayed, and FIG. 8B shows a state where the option character C has switched the air blower object F on to start ventilation.

In FIG. 9A, the main character G is displayed in the center of the screen, the option character C is displayed at the right side of the main character G, and an item S (here, sword) is displayed at an upper right part of the screen. FIG. 8A shows a state where the item S is locked and the lock mark L is displayed, and FIG. 8B shows a state where the option character C picks up the item S.

In FIG. 10A, the main character G is displayed in the center of the screen, the option character C is displayed at the left side of the main character G, and a citizen character T is displayed at an upper right part of the screen. FIG. 10A shows a state where the citizen character T is locked and the lock mark L is displayed, and FIG. 10B shows a state where the option character C plays with the citizen character T.

The present invention may also be embodied as follows.

(A) Although the targets are selected from the objects included in the game image by the target selecting device in the foregoing embodiment, objects in the game space which are not included in the game image may be selected as targets. In this embodiment, the game can be made more interesting and ingenious since enemy characters and the like which are not included in the game image by being hidden behind other objects can be selected as targets.

(B) Although the content of the action to be taken by the option character against the target locked after receipt of the instruction of the action from the operation means is determined in the foregoing embodiment, the content of the action may be determined after the target to be locked is selected. In this embodiment, operability can be further improved by adopting such a method for displaying, for example, a summary of the contents of the actions to be taken by the option character on the screen in synchronism with the display of the lock mark.

(C) Although the targets and the actions taken by the option character against these targets are in one-to-one correspondence in the foregoing embodiment, more targets may correspond to one action or one target may correspond to more actions. In the embodiment where more targets correspond to one action, a capacity of the action content data section 5a can be reduced. In the embodiment where one target correspond to more actions, the option character is allowed to take a variety of actions against one target, making the game more interesting and ingenious.

(D) Although the targets are selected from the candidates in an increasing order of their distances to the main character in the game space in the foregoing embodiment, preferential orders of selecting the targets may be so set as to correspond to the kind of the objects such as the characters, the items and the device objects. In this embodiment, necessity to instruct the change of the target is reduced by giving a higher priority to objects assumed to be highly interesting to the game player, thereby improving operability.

(E) Although the targets are selected from the candidates in an increasing order of their distances to the main character in the game space in the foregoing embodiment, the target change input button (third operable member) may be a joystick-type operable member capable of instructing directions, and a target located substantially in the instructed direction may be selected. In this embodiment, a degree of freedom of the game player's operation to instruct the change of the target is increased, thereby improving operability.

(F) Although the action content data section is provided in the main memory 5 in the foregoing embodiment, the action content data may be transferred from the storage medium 200 to the main memory 5 when necessary according to the progress of the game. This embodiment has an advantage that a necessary capacity of the main memory 5 can be reduced.

As described above, according to the present invention, the game player has more personal attachment to the option character since he can get involved in the option character's actions, with the result that the game can be made more interesting and ingenious. Further, since the object displayed in the game image is selected as a target, the target can be more easily recognized by the game player.

Further, since the game player can select the target to be locked, he can get more involved in the option character's actions. As a result, the game player has much more personal attachment to the option character, making the game even more interesting and ingenious.

On the other hand, the option character's actions can be made more realistic by selecting the object whose distance from the main character is a specified value or shorter, which provides a better presence. Further, a target selecting method easily understandable by the game player can be realized by selecting the targets in an increasing order of their distances to the main character. Furthermore, if a plurality of actions are prepared for one target, the action taken by the option character against this target cannot be uniquely determined even if the target is determined. This leads to an improved ingenuity of the game.

In summing up the aforementioned description, the present invention relates to a character action control method used in a video game in which game images including a main character and an option character which is a follower character of the main character are displayed in a game space. The method comprises the steps of: storing contents of actions taken by the option character against objects appearing in the game for each of the objects excluding the option character, selecting any one of the objects excluding the option character in the game space as a target in response to operation of a first operable member, displaying a visually recognizable mark for the selected object, and causing the option character to execute the content of the action against the target in response to operation of a second operable member. According to this method, the game player operates the first operable member to select the target. Further, when the game player operates the second operable member, an instruction is given to cause the option character to execute the content of action against the target. Since the game player can get involve in the option character's actions by the above two operations, he has more personal attachment to the option character, which leads to an improved ingenuity of the game.

In the above method, it may be possible to select one of the objects excluding the option character displayed in the game image as a target in response to operation of the first operable member. According to this method, the target becomes easily recognizable to the game player since the object displayed in the game image is selected as the target.

In the above method, it may also be possible to select one of the objects in the game space excluding the option character and the one selected in response to operation of the first operable member as a next target in response to operation of a third operable member, and displaying a visually recognizable mark for the next target. According to this method, since the target is changed when the game player operates the third operable member, he can get more involved in the option character's actions. As a result, he has even more personal attachment to the option character, which leads to a further improved ingenuity of the game.

In the selection process, it may be possible that the objects whose distances to the main character are a specified value or shorter in the game space are selected as the targets. According to this method, objects located away from the main character by a distance larger than the specified value are not detected as candidates for the target and the option character will take no action corresponding to such objects. This enables more reality to be given to the option character's actions, providing a better presence.

In addition, it may be possible that the targets are selected in an increasing order of their distances to the main character in the game space. According to this method, a target selecting method easily understandable to the game player can be realized since the objects are selected as the target in an increasing order of their distances to the main character.

In the above method, it may also be possible that a plurality of contents of actions are stored for at least one object and when this object is selected as the target in response to operation of the first operable member, the option character is caused to execute one of the contents of actions against the selected target in response to operation of the second operable member. According to this method, the ingenuity of the game can be improved since there are cases where the option character's action against the target is not uniquely determined even if the target is determined.

The present invention relates also to a readable storage medium storing a character action control program used in a video game in which game images including a main character and an option character which is a follower character of the main character are displayed in a game space. The program stored in the storage medium comprises the steps of: storing contents of actions taken by the option character against objects appearing in the game for each of the objects excluding the option character, selecting one of the objects excluding the option character in the game space as a target in response to operation of a first operable member, displaying a visually recognizable mark for the selected object, and causing the option character to execute the content of the action against the target in response to operation of a second operable member. According to this program, the game player operates the first operable member to select the target. Further, when the game player operates the second operable member, an instruction is given to cause the option character to execute the content of action against the target. Since the game player can get involve in the option character's actions by the above two operations, he has more personal attachment to the option character, which leads to an improved ingenuity of the game.

The present invention relates also to a video game system which comprises: image display means for displaying game images including a main character and an option character which is a follower character of the main character in a game space, action content storage means for storing contents of actions taken by the option character against objects appearing in the game for each of the objects excluding the option character, first operable member operable by a game player, target selecting means for selecting one of the objects excluding the option character in the game space as a target in response to operation of a first operable member, mark displaying means for displaying a visually recognizable mark for the selected object, second operable member operable by the game player, and action executing means for causing the option character to execute the content of the action against the target stored in the action content storage means in response to operation of the second operable member. With the video game system thus constructed, the game player operates the first operable member to select the target. Further, when the game player operates the second operable member, an instruction is given to cause the option character to execute the content of action against the target. Since the game player can get involve in the option character's actions by the above two operations, he has more personal attachment to the option character, which leads to an improved ingenuity of the game.

This application is based on Japanese patent application serial no. 2000-287462 in Japan Patent Office on Sep. 21, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A character action control method comprising the steps of:

displaying a game image including a main character and an option character which is a follower character following the main character from an initial appearance of the main character in a game space, storing contents of actions to be taken by the option character against objects appearing in the game in correspondence with the objects excluding the option character, selecting any one of the objects, excluding the option character, in the game space as a target object in response to operation of a first operable member by a game player, displaying a visually recognizable mark at the target object to indicate selection as the target object, and causing the option character to execute one of the contents of actions corresponding to the target object against the target object in response to operation of a second operable member by the game player.

2. A character action control method according to claim 1, wherein the step of selecting one of the objects, excluding the option character, is limited to selecting on the objects displayed in the game image as the target object in response to operation of the first operable member by the game player.

3. A character action control method according to claim 1, further comprising the step of selecting one of the objects in the game space, excluding the option character and the target object previously selected in response to operation of the first operable member, as a next target object in response to operation of a third operable member by the game player, and displaying a visually recognizable mark at the next target object.

4. A character action control method according to claim 3, wherein the next target object is selected in an increasing order of distances to the main character in the game space.

5. A character action control method according to claim 1, wherein ones of the objects permittable to be selected as the target object are limited to ones of the objects whose distances to the main character are a specified value or shorter in the game space.

6. A character action control method according to claim 1, wherein the contents of action, includes a plurality of contents of actions stored for at least one of the objects and when said at least one of the objects is selected as the target object in response to operation of the first operable member by the game player, the option character is caused to execute one of the plurality of contents of actions against the selected target object in response to operation of the second operable member by the game player.

7. A readable storage medium storing an executable character action control program used in a video game, the program comprising the steps of:

displaying a game image including a main character and an option character which is a follower character following the main character from an initial appearance of the main character in a game space, storing contents of actions to be taken by the option character against objects appearing in the game in correspondence with the objects excluding the option character, selecting any one of the objects, excluding the option character, in the game space as a target object in response to operation of a first operable member by a game player, displaying a visually recognizable mark at the target object to indicate selection as the target object, and causing the option character to execute one of the contents of actions corresponding to the target object against the target object in response to operation of a second operable member by the game player.

8. A readable storage medium according to claim 7, wherein the step of selecting one of the objects, excluding the option character, is limited to selecting on the objects displayed in the game image as the target object in response to operation of the first operable member by the game player.

9. A readable storage medium according to claim 7, one of the objects in the game space, excluding the option character and the target object previously selected in response to operation of the first operable member, as a next target object in response to operation of a third operable member by the game player, and displaying a visually recognizable mark at the next target object.

10. A readable storage medium according to claim 9, wherein the next target object is selected in an increasing order of distances to the main Character in the game space.

11. A readable storage medium according to claim 7, wherein ones of the objects permittable to be selected as the target object are limited to ones of the objects whose distances to the main character are a specified value or shorter in the game space.

12. A readable storage medium according to claim 7, wherein the contents of actions includes a plurality of contents of actions stored for at least one of the objects and, when said at least one of the objects is selected as the target object in response to operation of the first operable member by the game player, the option character is caused to execute one of the plurality of contents of actions against the selected target object in response to operation of the second operable member by the game player.

13. A video game system, comprising:

image display means for displaying game images including a main character and an option character which is a follower character of the main character from an initial appearance of the main character in a game space, action content storage means for storing contents of actions to be taken by the option character against objects appearing in the game in correspondence with the objects excluding the option character, first operable member operable by a game player, target selecting means for selecting one of the objects, excluding the option character, in the game space as a target object in response to operation of a first operable member by the game player, mark displaying mean, for displaying a visually recognizable mark at the target object to indicate selection as the target object, second operable member operable by the game player, and action executing means for causing the option character to execute one of the contents of actions corresponding to the target object against the target object in response to operation of a second operable member by the game player.

14. The video game system according to claim 13, wherein the target selecting means selects one of the objects, excluding the option character, is limited to selecting on the objects displayed in the game image as the target object in response to operation of the first operable member by the game player.

15. The video game system according to claim 13, wherein the target selecting means selects one of the objects in the game space, excluding the option character and the target object previously selected in response to operation of the first operable member, as a next target object in response to operation of a third operable member by the game player, and displaying a visually recognizable mark at the next target object.

16. The video game system according to claim 15, wherein said target selecting means selects the next target object in an increasing order of distances to the main character in the game space.

17. The video game system according to claim 13, wherein said target selecting means operates such that ones of the objects permitted to be selected as the target object are limited to ones of the objects whose distances to the main character are a specified value or shorter in the game space.

18. The video game system according to claim 13, wherein the contents of actions stored by the action content storage means includes a plurality of contents of actions for at least one object of the objects and said action executing means causes the option character, in response to operation of the second operable member by the game player, to take one of the plurality of action contents against the at least one object when selected as the target object by operation of the first operable member by the game player.

19. A character action control method comprising the steps of:
   displaying a game image including a main character and an option character which is a follower character following the main character from an initial appearance of the main character in a game space in such a manner that the main character represents a gains player and said option character follows a path of travel of the main character so as to remain within a predefined area of the main character except when the option character is ordered to perform an action by the game player;
   storing contents of actions to be taken by the option character against objects appearing in the game space in correspondence with the objects excluding the option character,
   selecting any one of the objects, excluding the option character, in the game space as a target object in response to operation of a first operable member by the game player;
   displaying a visually recognizable mark at the target object to indicate selection as the target object; and
   causing the option character to execute one of the contents of actions corresponding to the target object against the target object in response to operation of a second operable member by the game player.

20. A character action control method comprising the steps of:
   displaying a game image including a main character and an option character which is a follower character following the main character from an initial appearance of the main character in a game space in such a manner that the main character is a human figure and represents a game player and said option character is an animal figure that follows a path of travel of the main character so as to remain within a predefined area of the main character except when the option character is ordered to perform an action by the game player;
   storing contents of actions to be taken by the option character against objects appearing in the game space in correspondence with the objects excluding the option character,
   selecting any one of the objects, excluding the option character, in the game space as a target object in response to operation of a first operable member by the game player;
   displaying a visually recognizable mark at the target object to indicate selection as the target object; and
   causing the option character to execute one of the contents of actions corresponding to the target object against the target object in response to operation of a second operable member by the game player.

* * * * *